US007650055B2

United States Patent
Cox et al.

(10) Patent No.: US 7,650,055 B2
(45) Date of Patent: Jan. 19, 2010

(54) TERMINAL WITH INTERNAL ENVIRONMENTAL SEAL

(75) Inventors: Terry Dean Cox, Keller, TX (US); Ziwei Liu, Ft. Worth, TX (US); Marcel G. Mures, Ft. Worth, TX (US); Diana Rodriguez, Alvarado, TX (US); Howard C. Schwartz, Dallas, TX (US); Kevin L. Strause, Keller, TX (US)

(73) Assignee: Corning Cable Systems LLC, Hickory, NC (US)

( * ) Notice: Subject to any disclaimer, the term of this patent is extended or adjusted under 35 U.S.C. 154(b) by 164 days.

(21) Appl. No.: 11/881,518

(22) Filed: Jul. 27, 2007

(65) Prior Publication Data

US 2008/0298765 A1 Dec. 4, 2008

Related U.S. Application Data

(60) Provisional application No. 60/932,659, filed on May 31, 2007.

(51) Int. Cl.
G02B 6/00 (2006.01)
G02B 6/44 (2006.01)
H02G 3/18 (2006.01)
H02G 13/00 (2006.01)
H02G 3/14 (2006.01)
H02G 15/04 (2006.01)
H02G 15/08 (2006.01)

(52) U.S. Cl. .................. 385/135; 385/100; 385/105; 385/109; 385/110; 385/134; 385/136; 385/137; 385/138; 385/139; 385/147; 174/60; 174/63; 174/64; 174/67; 174/74 R; 174/77 R; 174/92; 174/93

(58) Field of Classification Search ................ 385/100, 385/105, 109, 110, 134–139, 147; 174/60, 174/61, 63, 64, 65 SS, 65 R, 67, 74 R, 77 R, 174/84 R, 86, 88 R, 92, 93
See application file for complete search history.

(56) References Cited

U.S. PATENT DOCUMENTS 4,553,812 A 11/1985 Kōjiro et al. ................ 350/96.2

(Continued)

FOREIGN PATENT DOCUMENTS

EP 0110673 B1 11/1983

(Continued)

Primary Examiner—Brian M. Healy
Assistant Examiner—Hung Lam
(74) Attorney, Agent, or Firm—John H. Vynalek (57) ABSTRACT

An environmentally sealed closure, such as a terminal for terminated ends of fiber optic cables, includes a housing having a wall defining an interior volume. A floating sealing assembly is provided including a first plate, a seal member and a second plate arranged in a stack within the interior volume. The seal member has an outer sealing edge for contacting the wall of the housing, which may be straight and/or chamfered. Fiber optic cables extend through the sealing assembly so that the terminated ends are within the splice area. The floating sealing assembly is compressed so as to place the outer sealing edge of the seal member in sealing contact with the wall of the housing. When a pressure differential exists between the splice area and the outside of the housing only one of the first or second plates moves along the longitudinal axis to further compress the seal member and increase sealing between the outer sealing edge and the housing wall.

19 Claims, 8 Drawing Sheets

U.S. PATENT DOCUMENTS

| | | | |
|---|---|---|---|
| 4,602,840 A | 7/1986 | Romatzick | 339/97 P |
| 4,834,479 A | 5/1989 | Adl | 350/96.2 |
| 5,091,987 A | 2/1992 | MacCulloch et al. | 385/66 |
| 5,185,845 A * | 2/1993 | Jones | 385/135 |
| 5,481,639 A * | 1/1996 | Cobb et al. | 385/135 |
| 6,053,054 A | 4/2000 | Wusterbarth et al. | 73/861.28 |
| 6,184,470 B1 | 2/2001 | Froehlich et al. | 174/77 R |
| 6,275,641 B1 * | 8/2001 | Daoud | 385/135 |
| 6,417,453 B1 | 7/2002 | Lapp et al. | 174/93 |
| 6,802,512 B2 | 10/2004 | Muller et al. | 277/607 |
| 6,875,926 B2 * | 4/2005 | Buekers et al. | 174/100 |
| 2002/0146229 A1 * | 10/2002 | Roberts | 385/135 |

FOREIGN PATENT DOCUMENTS

| | | |
|---|---|---|
| EP | 0124987 B1 | 6/1988 |
| EP | 0251396 B1 | 9/1992 |
| EP | 0646294 B1 | 6/1996 |
| GB | 2087170 A | 5/1982 |

* cited by examiner

TERMINAL WITH INTERNAL ENVIRONMENTAL SEAL

CROSS-REFERENCE TO RELATED APPLICATION

The present application claims priority pursuant to 35 U.S.C. 119(e) to U.S. Provisional Application Ser. No. 60/932,659, filed May 31, 2007.

BACKGROUND OF THE DISCLOSURE

When fiber optic cables are spliced, the ends of the cables are often held within a terminal or the like to protect the ends of the cables and any connective equipment. Such terminals must cover and protect the cable ends from potential environmental damage caused by temperature variations, pressure variations, moisture, insects, etcetera. Any openings provided in the terminal to allow the cables to enter should thus be reliably sealed around the cables at the point of entry but still allow for manipulation of the cable by a craftsman when necessary. At the same time, the terminals must be robust enough to securely hold the cables in place. The terminal may also have to be able to withstand and maintain internal and external pressure differences due to environmental temperature and pressure fluctuations or water immersion.

In EP 0 646 294 B1, Pieck et. al. attempt to seal fiber optic cables by bolting two plates together with a sealing material compressed between the plates. More specifically, the sealing material is compressed axially about a spliced cable and radially extends to the walls of a base. The axial compression is set during installation and does not change unless it is later manually altered. As internal and external pressures change, the entire seal, comprising the two plates and the sealing material, slides a certain amount axially. In other words, the two joined plates move in unison in response to ambient pressure changes. At least one drawback to this fixed arrangement is that the set compression of the sealing material does not alter automatically in response to pressure changes for ideal sealing of the spliced cable. Thus, improved structures and methods for securely housing spliced fiber optic cables within a terminal would be welcome.

BRIEF SUMMARY OF THE DISCLOSURE

The various embodiments of the present disclosure provide fiber optic terminals and related structures that house terminated fiber optic cables for splicing.

Further embodiments provide increased sealing when a pressure differential exists between an inside and an outside of the terminal.

Still further embodiments provide a floating sealing assembly with the terminal and/or a compression mechanism for compressing a sealing mechanism to provide a seal upon assembly of the terminal.

In one particular embodiment, a fiber optic cable terminal includes a housing having an opening defining an edge and a longitudinal axis. The housing also includes a wall defining an interior and includes an internal shoulder portion and an external shoulder portion. The internal shoulder portion delimits or defines an interior area within the interior.

In this embodiment, a first plate is located within the interior proximate the interior area in floating contact with the internal shoulder portion. The first plate is urged against the internal shoulder portion in a first pressure state and is urged in a direction of the opening in a second pressure state.

Also in this embodiment, a seal is located within the interior and has a first side, a second side opposite the first side, and a peripheral area. The second side is in contact with the first plate, and the peripheral area is in contact with an interior portion of the housing.

Further in this embodiment, a second plate is located at least partially within the interior and is in contact with the first side of the seal. The second plate has a flange portion in floating contact with the edge of the housing. The flange portion is urged against the edge in the first pressure state.

A plurality of openings are also defined in the first plate, the second plate and the seal member in this embodiment. The respective openings are generally axially aligned and sized to selectively sealingly receive respective fiber optic cables therethrough.

Also in this embodiment, a compression member is placed about the housing and connected to the second plate to compress the seal with a preloaded pressure between the first plate and the second plate and to urge the peripheral area in a direction of the interior portion of the housing to seal the terminal. The compression member further includes a lip in floating contact with the external shoulder portion. The lip is urged away from the external shoulder portion in the first pressure state and is urged against the external shoulder portion in the second pressure state. The first pressure state and the second pressure state create a pressure differential between the interior area and an ambient pressure level to cause independent movement of the first and second plates to further compress the seal and increase the preloaded pressure of the seal.

It should be understood that the various concepts and embodiments disclosed herein may be combined and modified in various ways to achieve new embodiments within the scope of the disclosure. Therefore, the above aspects of various embodiments should not be considered limiting, and the entire specification, drawings and the appended claims and their permissible equivalents should be consulted to understand the full scope of the disclosure.

BRIEF DESCRIPTION OF THE SEVERAL VIEWS OF THE DRAWINGS

Having thus described the disclosure in general terms, reference will now be made to the accompanying drawings, which are not necessarily drawn to scale and are meant to be illustrative and not limiting, and wherein:

DETAILED DESCRIPTION OF THE DISCLOSURE

The present disclosure now will be described more fully hereinafter with reference to the accompanying drawings, in which some, but not all possible embodiments are shown. Indeed, the disclosure may be embodied in many different forms and should not be construed as limited to the embodiments set forth herein; rather, these embodiments are provided so that this disclosure will satisfy applicable legal requirements. Although apparatuses for providing fiber optic terminals are described and shown in the accompanying drawings with regard to specific types of housings and/or seals, it is envisioned that the functionality of the various apparatuses and methods may be applied to any now known or hereafter devised housings and/or seals in which it is desired to terminate fiber optic cables.

The detailed description uses numerical and letter designations to refer to features of the drawings. Like or similar designations of the drawings and description have been used to refer to like or similar parts of various embodiments according to the disclosure.

With reference to FIGS. 1, 2, 3 and 4, an environmentally sealed closure in accordance with one embodiment of the present disclosure is designated in general by the reference numeral 10. Although the embodiments described herein regard fiber optic cables, fiber optic terminals and the like, further embodiments of the present invention include non-fiber based telecommunications closures and terminals, such as copper-based systems to provide one non-limiting example, while still further embodiments include environmentally sealed closures for non-telecommunications applications. As shown in FIGS. 1, 2, 3 and 4, a fiber optic cable 12, which may be spliced, terminated or joined and is illustrated in phantom for clarity, is sealed by the fiber optic cable terminal 10. Further embodiments of the environmentally-sealed closure include one or more input members, such as fiber optic cables, copper cables, conduits, pipes, and the like to provide non-limiting examples, that pass into and/or out of the closure while maintaining the seal of the closure. The fiber optic cable terminal 10 of the illustrated embodiment broadly includes a housing 14, an elastomeric seal 16 positioned between two independently movable or floating plates 18, 20, and a compression ring 22. As described in greater detail below, the seal 16 and the two plates 18, 20 may be stacked together as an assembly and the seal 16 "pre-loaded" with a predetermined pressure. When a pressure level within a splice or interior area 29 of the fiber optic cable terminal 10 differs from an ambient pressure level outside the housing 14, the seal member 16 will become further compressed between the plates 18, 20 as the plates move independent of one another in response to the pressure differential. Among other advantages, this independent plate movement permits the fiber optic cable terminal 10 to react to subtle pressure changes thereby providing the industry with a more efficient and effective dynamic seal for spliced cables.

Figure 1:
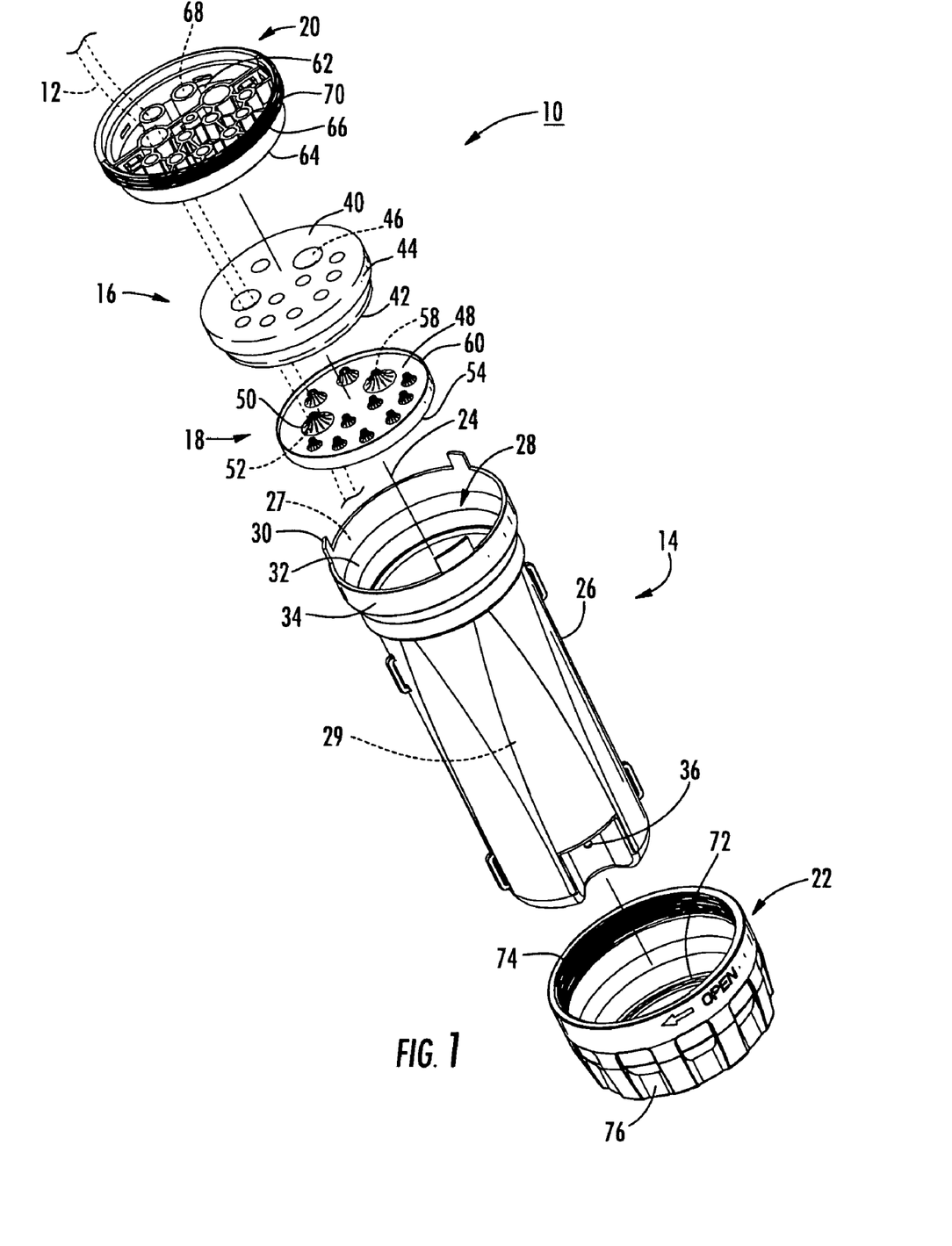
FIG. 1 is an exploded, perspective view of a fiber optic cable terminal seal according to one embodiment of the disclosure.

With particular reference to FIG. 1, the housing 14 (alternatively, a shell, a canister, etcetera) is cylindrical in shape in this example having a central or longitudinal axis 24. Surrounding the axis 24 is a wall 26 that defines an opening 27 and which forms a chamber, interior or volume 28 that in turn defines the interior area 29 briefly introduced above. As shown, the housing 14 includes one or more projections or leading edges 30 that interact with the movable plate 20 as will be described in greater detail below. The housing 14 further defines an internal shoulder or portion 32 and an opposing external shoulder or portion 34, which respectively interact with the plate 18 and the compression ring 22 as also described in greater detail below. Further, the housing 14 includes an air valve or conduit 36 for pressurizing the interior area 29 to test the assembled fiber optic cable terminal 10 for potential leaks as will be understood from the following descriptions and exemplary operations.

FIG. 1 also shows the seal 16 located between the plates 18, 20. The seal 16 may be a soft rubber, a gelatin or gel-like substance or other elastomeric material having extensible and resilient properties suitable for compression between the plates 18, 20 to provide a dynamic seal about the fiber optic cable 12 and to seal the interior volume 28 from insects, dirt, dust, liquids and other contaminants. As shown, the seal 16 has a first side or face 40 and an opposing second side or face 42, which define an outer sealing edge, periphery or peripheral area 44. One or more holes or apertures 46 are formed through the sides 40, 42 for passage of one or more respective lines or cables such as the fiber optic cable 12. By way of brief explanation, some material of the seal 16 when under compression will seat or press against that portion of the fiber optic cable 12 passing through apertures 46. Also as discussed further below, other material of the seal 16 forming the periphery 44 will seat or press against an inner portion of the housing 14 when under compression to seal the interior area 29 as mentioned above.

The first or inner floating plate 18 shown in FIG. 1 also includes a first side or face 48 and a second side or face 54. The first side 48 most clearly shows a plurality of conduits or port fingers 50, each having a respective plurality of slits 52 disposed about respective holes 58, which are complementary in size, shape and position to the apertures 46 of the seal 16 introduced above. As known to those skilled in the art, the slits 52 of the port fingers 50 expand to facilitate passage of lines or cables, such as the fiber optic cable 12, through the holes 58. Once the fiber optic cable 12 is in a desired position, the port finger 50 grips the fiber optic cable 12 sufficiently tightly to hold the fiber optic cable 12 in the desired position. A complementary set of port fingers 56 may be located on the second side 54 (see FIG. 3) but further explanation is not necessary for one skilled in the art of cable terminal seals to understand and practice this aspect of the disclosure.

FIG. 1 further shows that the plate 18 may also include a circular ridge or flange 60. As described by way of an exemplary operation below, the flange 60 mates with a portion of the second side 42 of the seal 16 to assist in seating the plate 18 against the seal 16 to form a tight seal under pressure.

Similar to the plate 18, the plate 20 shown in FIG. 1 is also a dynamic, independently movable plate, which also has a first side or face 62 and an opposing second side or face 64. As shown, the first side 62 includes a set of holes or apertures 68, which are complementary in size, shape and position to the apertures 46 of the seal 16 introduced above. Those skilled in the art will instantly recognize that some of the apertures 68 are sized relatively larger as entry and exit ports for distribution cables or are sized relatively smaller as drop ports for drop cables to exit the fiber optic cable terminal 10 to homes or businesses and the like. Still further, some of the apertures 68 are sized to accommodate various other sized cables (not shown) for other applications.

With continued reference to the plate 20 in FIG. 1, a flange 66 is shown proximate the first side 62 and carries a set of male or externally positioned helical threads 70. As explained below, these threads 70 engage complementary helical threads 74 of the compression ring 22 to assemble the fiber optic cable terminal 10 as shown in FIG. 2.

Figure 2:
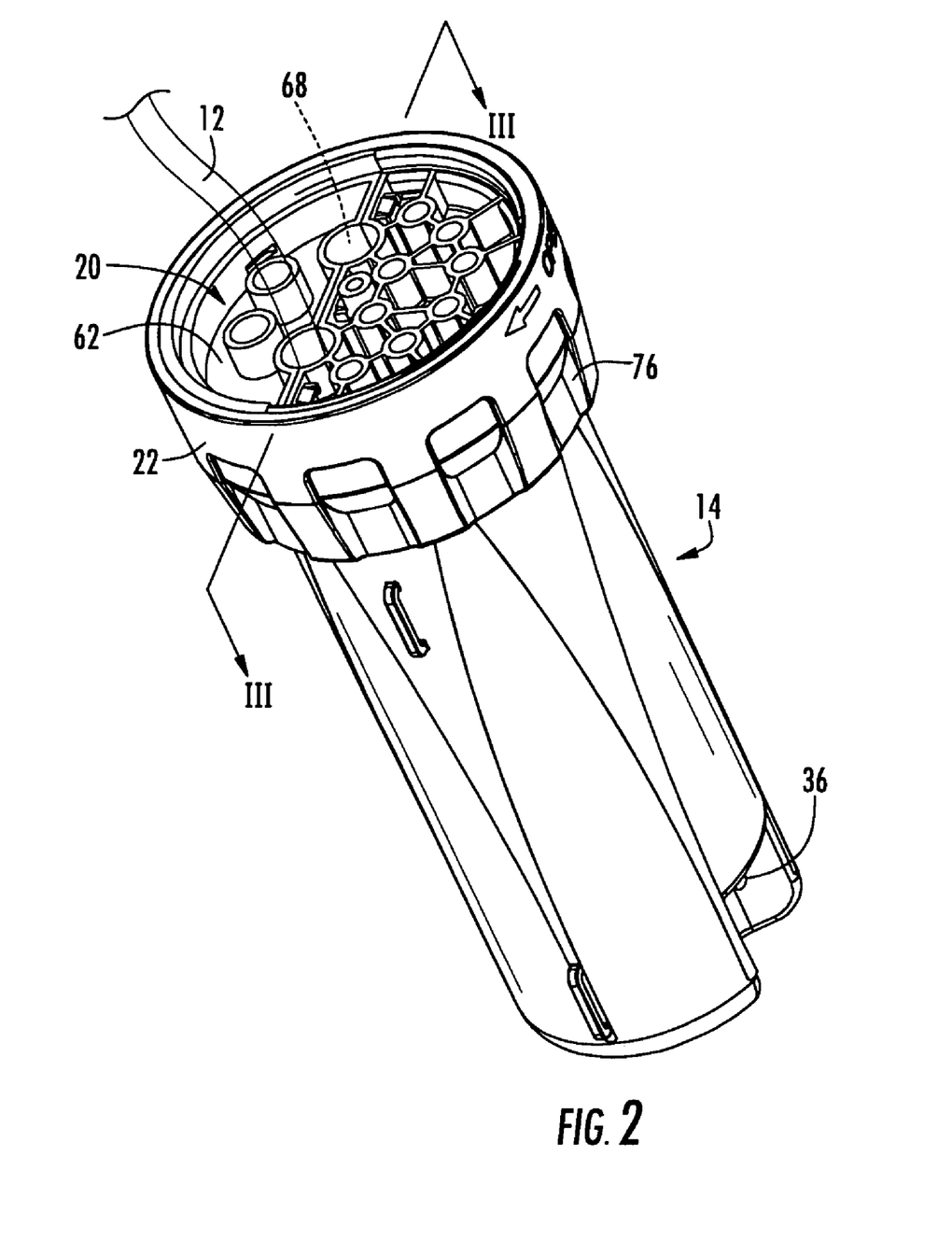
FIG. 2 is a perspective view of the assembled fiber optic cable terminal seal as in FIG. 1.

Now with particular reference to both FIGS. 1 and 2, the compression ring 22 includes a projection or inwardly projecting lip 72, the set of female or internally positioned helical threads 74 briefly introduced above, and a textured grip or knurled formations 76. The lip 72 may be a plurality of discretely spaced projections or may be circular or ring-shaped as shown in this example. As explained in greater detail below, the lip 72 will selectively engage the external shoulder portion 34 of the housing 14 based on pressure changes. To do so, the threads 70, 74 must be screwed together or otherwise engaged. In this example, a technician upon task completion can slide the components of FIG. 1 together, including sliding the compression ring 22 over the housing 14 until the threads 70 of the exterior plate 20 abut the threads 74 of the compression ring 22. The technician may then twist the textured grip 76 to engage the threads 70, 74, which in turn compresses the seal 16 between the plates 18, 20. In the example shown in FIG. 2, the housing 14 and the compression ring 22 are hand tightened, but those skilled in the art will appreciate that a torque tool and meter may be used to tighten the components to specific pressure and torque readings if necessary.

The skilled artisan will further readily understand that although circular-shaped components and helical thread attachments have been shown and described, other forms and methods of attachment may be used in addition to or as alternatives to the aforementioned. For example, the threads 70, 74 may be replaced by or supplemented with snap-fit or squeeze-fit components. Likewise, square or rectangular shaped pressure plates may be substituted for the circular-shaped plates 18, 20 if snap-fit or squeeze-fit attachments are utilized. Thus, the disclosure should not be construed as being limited only to the mechanical attachments and devices shown in FIGS. 1 and 2 but should instead be broadly construed to include equivalent structures for releasably securing and compressing together the components of the fiber optic cable terminal 10.

Figure 3:
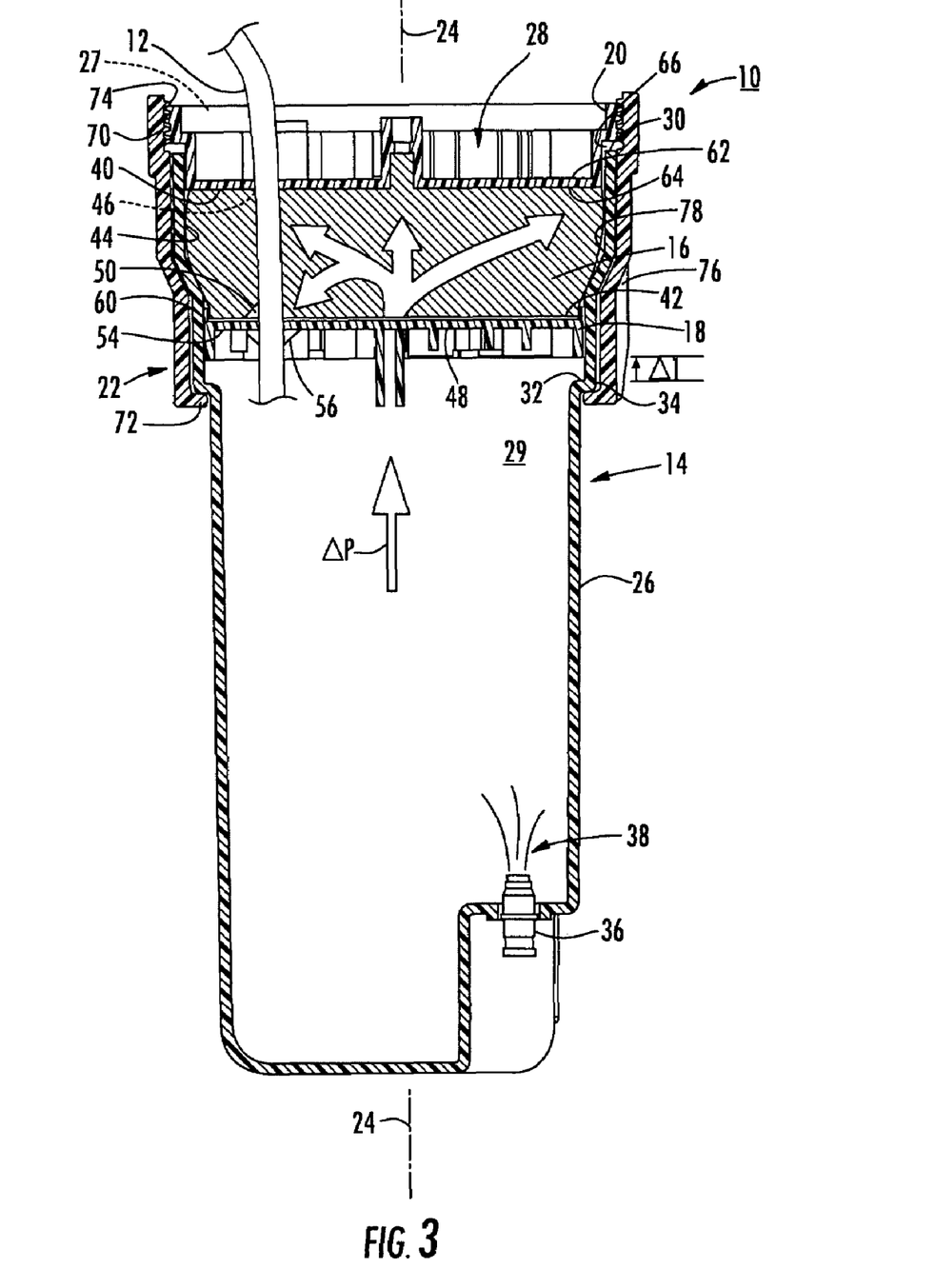
FIG. 3 is an elevational view of a cross-section of the fiber optic cable terminal seal taken along line III-III in FIG. 2, particularly showing an increase of the internal pressure.
Figure 4:
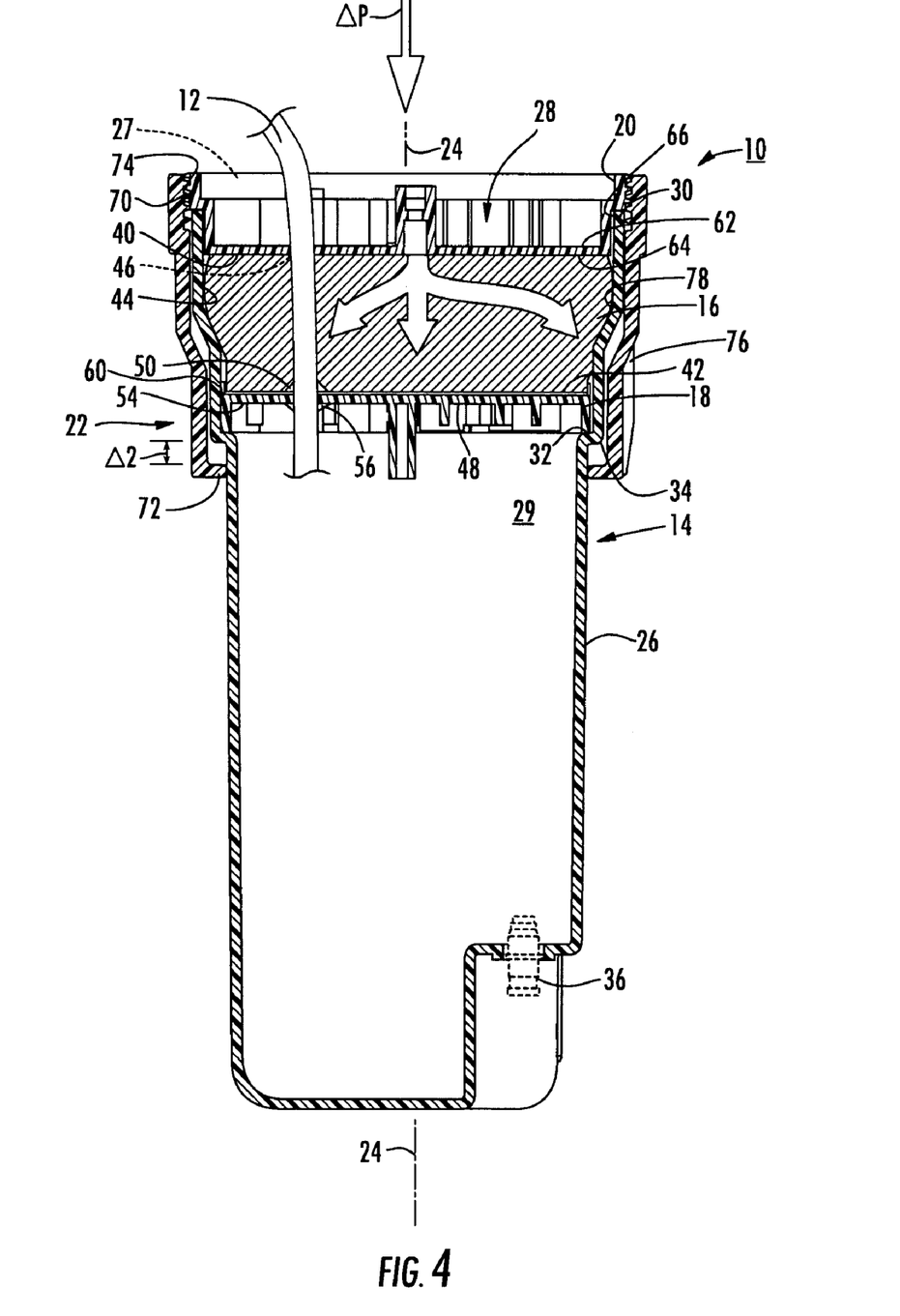
FIG. 4 is an elevational cross-sectional view similar to FIG. 3, particularly showing an increase of the external pressure.

The disclosure may be better understood with reference now to FIGS. 3 and 4 and to an exemplary operation of the fiber optic cable terminal 10 introduced above.

FIG. 3 shows detailed features and aspects of the embodiment illustrated in FIGS. 1 and 2. In particular, FIG. 3 shows a first step after assembly of the fiber optic cable terminal 10 by which the technician pressurizes the interior area 29 via the air valve 36, for instance, to about 5 to 10 pounds per square inch (psi) above ambient pressure as indicated schematically by air 38. The air valve 36 may be a Schrader poppet-type valve, a Presta-type valve or other suitable valve for pressurizing the interior area 29.

After pressurization, the technician may apply a thin film of soapy water (not shown) around the protruding cable 12, for instance, to visually inspect for bubbles, which could indicate a leak in the fiber optic cable terminal 10. The technician can also listen of course for escaping air that might suggest a leak. Assuming the technician does not hear or observe any leaks from the fiber optic cable terminal 10, the technician may release the excess air 38 and cap or otherwise seal the air valve 36. At this stage, pressure in the interior area 29 should be substantially equal to ambient or external pressure; i.e., no substantial pressure differential should exist at this point. Also, the seal 16 is under compression with a preloaded pressure as a result of having mated the housing 14 and the compression ring 22 together and having equalized the internal and external pressures. Due to completion of its test function, the air valve 36 and similar valves in further embodiments described below are indicated in phantom in the remaining FIGS. 4-8 and are not referred to again.

With further reference to FIG. 3 (and now disregarding the air valve 36 and the air 38), a pressure condition is illustrated by an arrow $\Delta P$. This pressure condition $\Delta P$ may be caused by an external temperature increase that causes the air or gas in the interior area 29 to expand, which in turn causes the interior pressure to increase. As shown, the increased interior pressure pushes against the second side 54 of the plate 18, which urges the first side 48 against the second side 42 of the seal 16. Due to a chamfered area 78 of the housing 14, the material of the seal 16 is compressed both axially and radially as schematically illustrated by the bold arrows superimposed on the seal 16. More specifically, the compressive force caused by the internal pressure increase is shown by the bold arrows to be more efficiently transferred throughout the material of the seal 16, which more effectively seals the cable 12 and the interior area 29. Alternatively stated, the chamfered area 78 funnels and transfers the compressive force to press the seal 16 more rapidly and equally within the housing 14, about the cable 12 and around the port finger 50 as shown.

The force distribution shown in FIG. 3 is also apparent by a position change of the lip 72 of the compression ring 22. As shown, the lip 72 is caused to engage the external shoulder portion 34 of the housing 14 as indicated by the symbol $\Delta 1$. Accordingly, the increased internal pressure condition shown in FIG. 3 results in a tight seal due to independent movement of the plate 18. Although FIG. 3 appears to illustrate discrete pressure and position changes represented respectively by $\Delta P$ and $\Delta 1$, those skilled in the art will understand that these changes may be gradual with many gradations. In other words, the embodiment of FIG. 3 will react to a range of pressure changes and change positions of the plate 18 accordingly.

Turning now to FIG. 4, another pressure condition is illustrated by the arrow $\Delta P$ shown external to the fiber optic cable terminal 10. In this example as external pressure $\Delta P$ gradually increases against the first side 62 of the outer plate 20, the seal material of the seal 16 is compressed both axially and radially, which is schematically illustrated by the bold arrows again superimposed on the seal 16. As noted above, the chamfered area 78 assists in funneling and transferring the compressive force to press the seal 16 against the interior of the housing 14, about the cable 12 and around the port finger 52 to form a tight seal against external contaminants.

Those skilled in the art will understand that the condition shown in FIG. 4 may be caused not only by the increased external pressure $\Delta P$ noted above but by a temperature decrease that can cause the gas in the interior area 29 to contract. In such a temperature change event, the plate 20 will behave similarly to the increased external pressure condition $\Delta P$. Moreover, since the fiber optic cable terminal 10 may be used underground or below grade, it may come into contact with water or other liquids. Accordingly, liquid pressure against the plate 20 may also cause the dynamic reaction described above. In all of these scenarios, the force distribution in FIG. 4 is again shown by reference to a position change of the lip 72 of the compression ring 22. As shown, the lip 72 is caused to disengage from the external shoulder portion 34 of the housing 14 as indicated by the symbol $\Delta 2$. Further, the edge 30 of the housing 14 is now shown engaged with the flange 66 of the plate 20 with the caveat again being that various interim positions of these components may be observed under various conditions.

Figure 5:
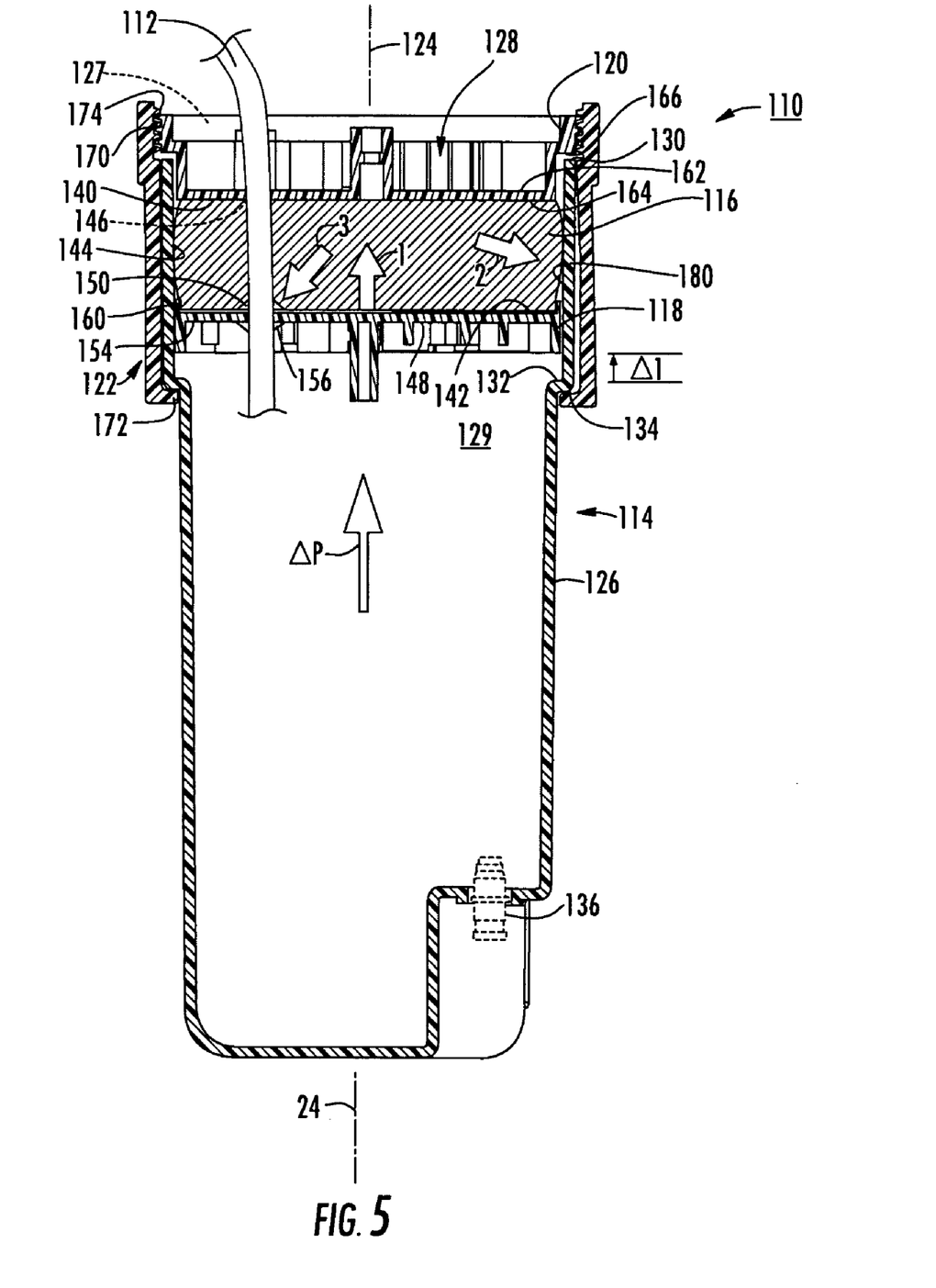
FIG. 5 is an elevational view of a cross-section of a fiber optic cable terminal seal according to another embodiment of the disclosure, particularly showing an increase of the internal pressure.
Figure 6:
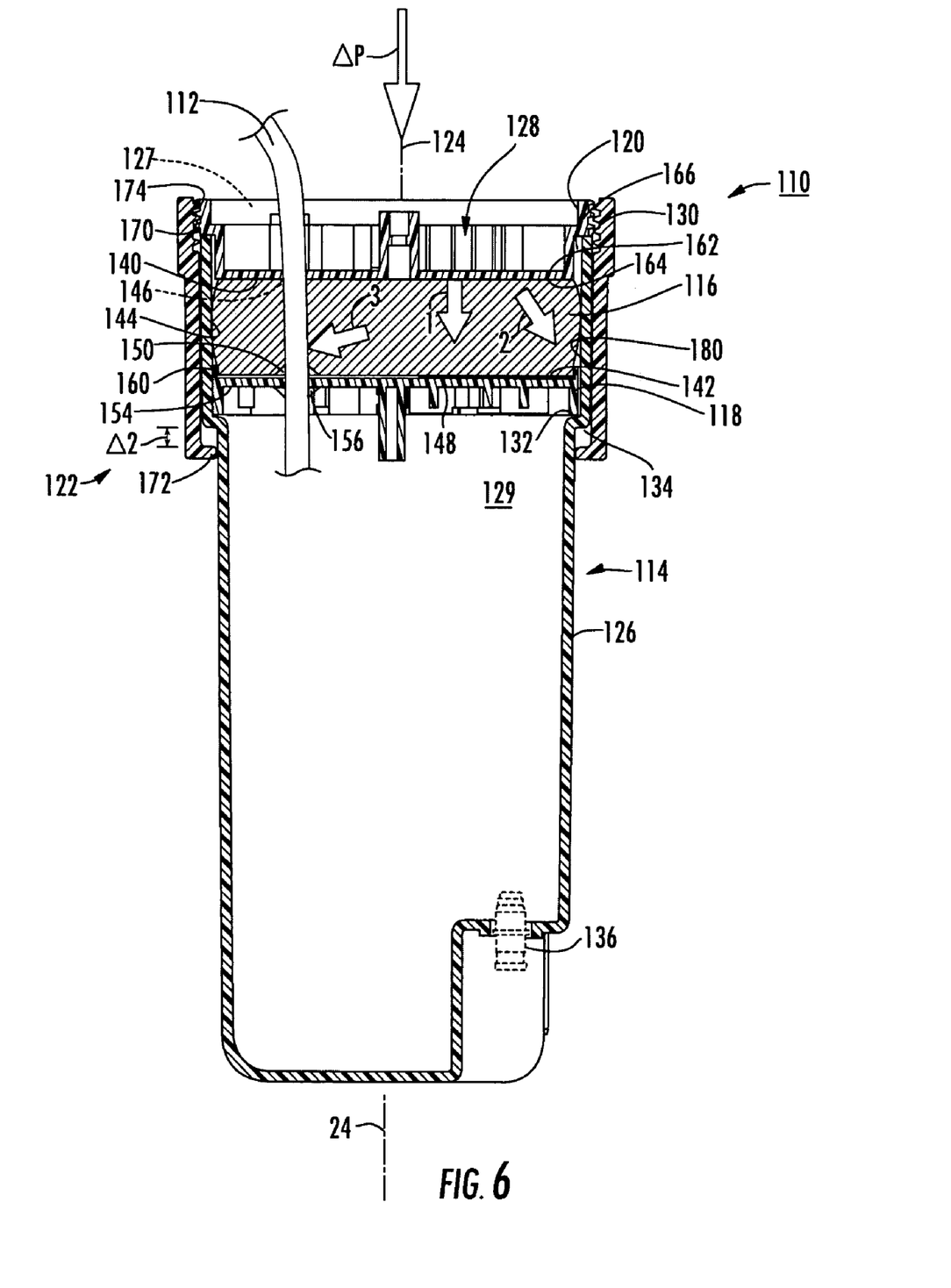
FIG. 6 is an elevational cross-sectional view similar to FIG. 5, particularly showing an increase of the external pressure.

Another embodiment of a fiber optic cable terminal according to the disclosure is shown in FIGS. 5 and 6 broadly indicated by reference numeral 110. The fiber optic cable terminal 110 and its components are similar in many ways to the embodiment previously described. Accordingly for clarity and brevity, only certain components of the fiber optic cable terminal 110 will be discussed below. To ensure a full enabling disclosure, reference is hereby made to similar components of the previous embodiment not otherwise expressly discussed with respect to the fiber optic cable terminal 110.

FIG. 5 particularly shows the fiber optic cable terminal 110 experiencing a pressure condition illustrated by an arrow ΔP. As previously noted, this pressure condition ΔP may be caused by an external temperature increase that causes the air or gas in the interior area 129 to expand, which in turn causes the interior pressure to increase. The increased interior pressure pushes against a second side 154 of an internal plate 118, which urges its first side 148 against a second side 142 of a seal 116.

Also shown in FIG. 5, an exemplary housing 114 has a substantially straight wall 180 lacking a chamfered area. Thus, although the material of the seal 116 is compressed, the compressive force, schematically illustrated in part by bold arrows 1 and 2, is not as efficiently transferred both axially and radially as in the foregoing embodiment. Accordingly, a third force transfer component is indicated by bold arrow 3. Stated another way, without a chamfered surface to funnel the compressive forces, the forces are somewhat diluted and transferred less efficiently before the seal 116 fully seals against the interior of the housing 114, about the cable 112 and around the port finger 152.

FIG. 6 is similar in some ways to FIG. 4. As an external pressure ΔP gradually increases against a first side 162 of an outer plate 120, the seal material of the seal 116 is compressed. Again, however, due to the relatively straight walls 180 of the housing 114, there is no chamfered area to assist in funneling and more efficiently transferring the compressive force to press the seal 116 against the interior of the housing 114, about the cable 112 and around the port finger 152.

Figure 7:
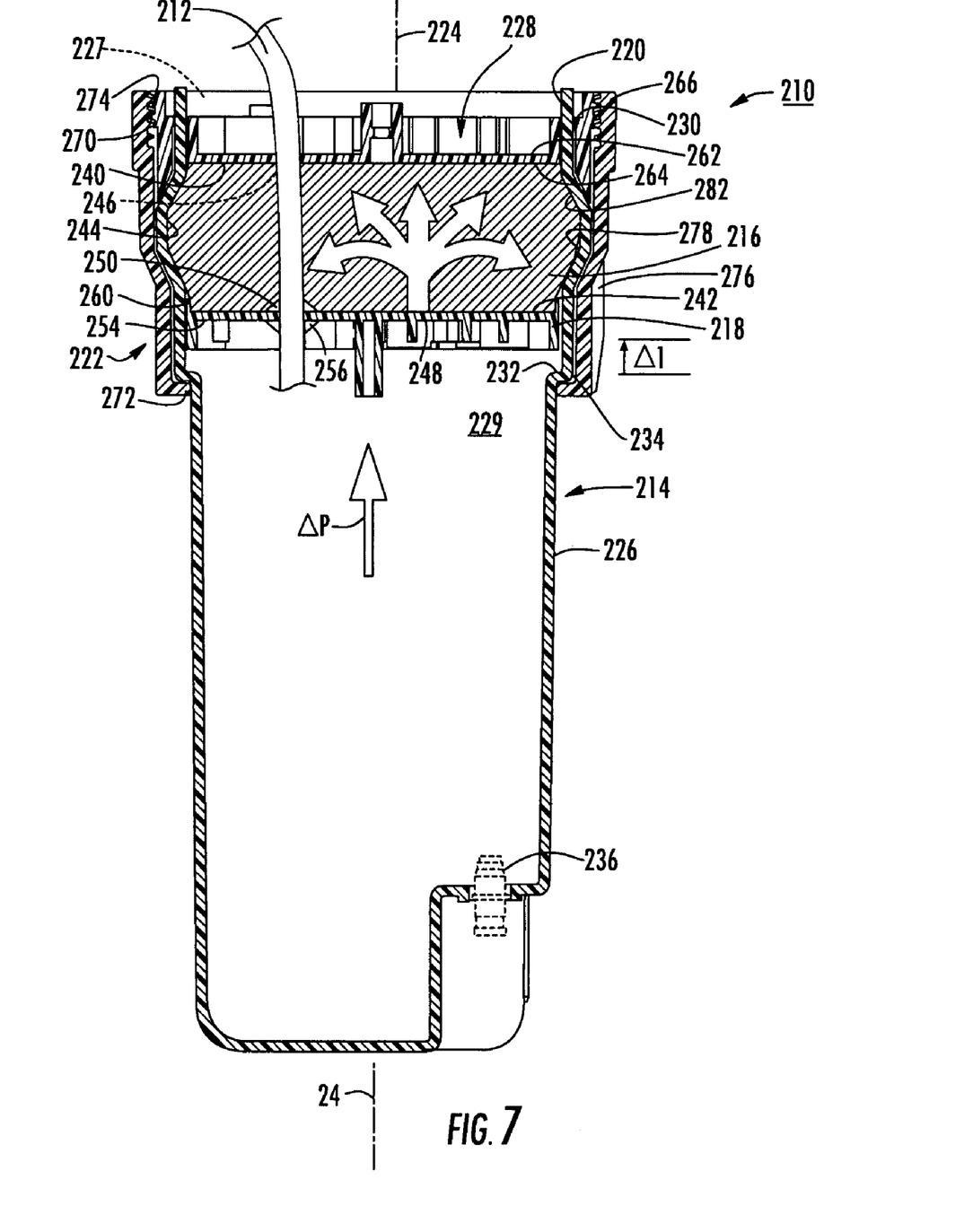
FIG. 7 is an elevational view of a cross-section of a fiber optic cable terminal seal according to a further embodiment of the disclosure, particularly showing an increase of the internal pressure.
Figure 8:
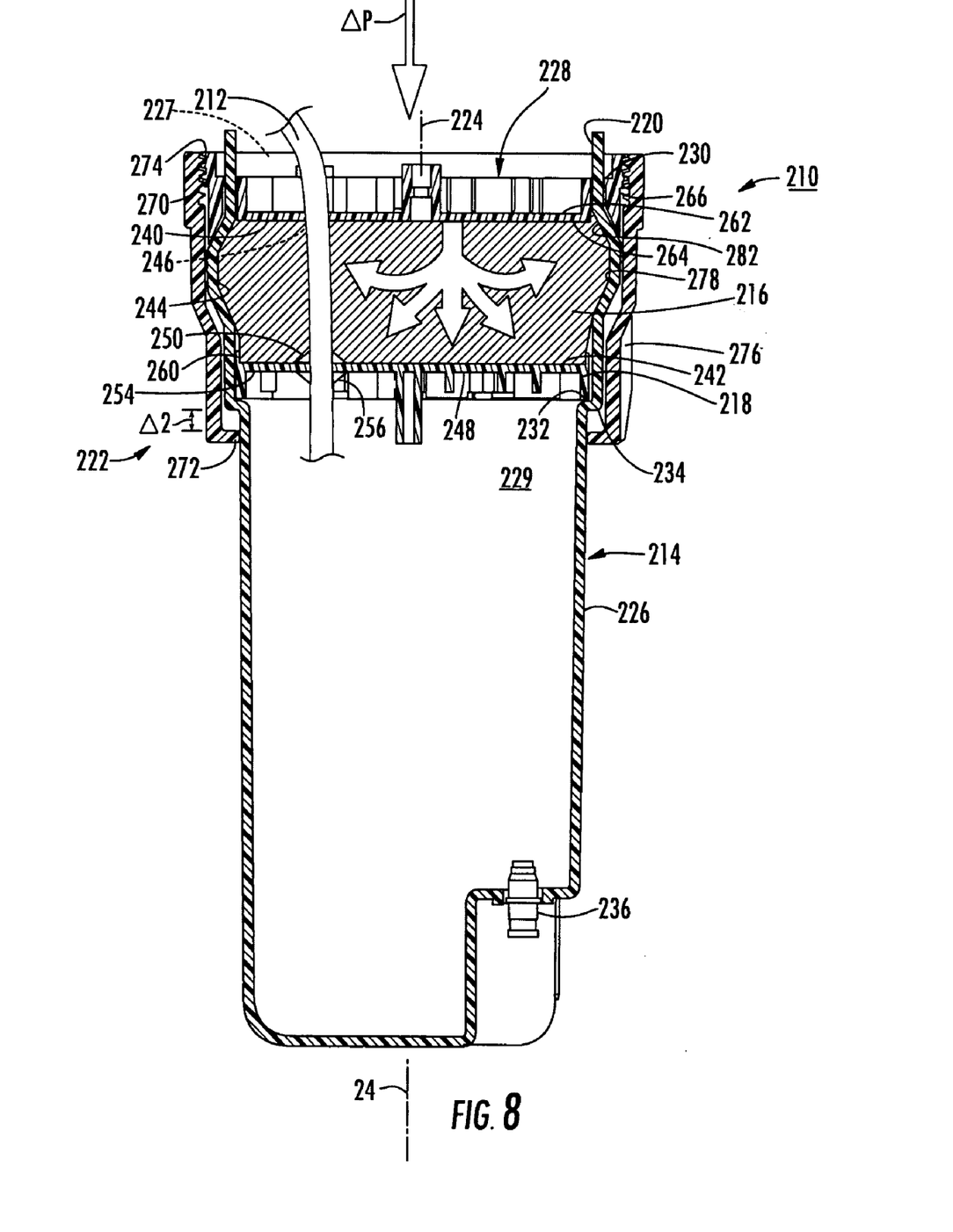
FIG. 8 is an elevational cross-sectional view similar to FIG. 7, particularly showing an increase of the external pressure.

Turning now to FIGS. 7 and 8, a further embodiment of a fiber optic cable terminal according to the disclosure is shown, which is broadly referred to by numeral 210. Again, the fiber optic cable terminal 210 and its components are similar in many ways to the previously described embodiments and reference is hereby made to similar components of the previous embodiments not otherwise expressly discussed with respect to the fiber optic cable terminal 210.

FIG. 7 particularly shows the fiber optic cable terminal 210 experiencing a pressure condition illustrated by an arrow ΔP. As previously noted, this pressure condition ΔP may be caused by an external temperature increase that causes the air or gas in the interior area 229 to expand, which in turn causes the interior pressure to increase. As shown, the increased interior pressure pushes against a second side 254 of an internal plate 218, which presses its first side 248 against a second side 242 of a seal 216. Due to a chamfered area 278 of the housing 214, the material of the seal 216 is compressed both axially and radially as schematically illustrated by the superimposed bold arrows. More specifically, the compressive force caused by the internal pressure increase is most efficiently transferred throughout the material of the seal 216 in this embodiment, which most readily and effectively seals the cable 212 and the interior volume 228. Alternatively stated, the chamfered area 278 funnels and transfers the compressive force to press the seal 216 rapidly and equally to the interior of the housing 214, about the cable 212 and around the port finger 252.

With reference to FIG. 8, another pressure condition is illustrated by the arrow ΔP, this time shown external to the fiber optic cable terminal 210. In this example as external pressure gradually increases against the first side 262 of the outer plate 220, the seal material of the seal 216 is compressed both axially and radially, which is schematically illustrated by the superimposed bold arrows. In this instance, another chamfered area 282 assists in funneling and transferring the compressive force to press the seal 216 against the interior of the housing 214, about the cable 212 and around the port finger 252 to form a tight seal against external contaminants.

Many modifications and other embodiments set forth herein will come to mind to one skilled in the art to which the disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims.

Moreover, although specific terms are employed herein, they are used in a generic and descriptive sense only and not for purposes of limitation. Likewise, numerical ranges are set forth for current applications and industry regulations, but these ranges may be altered to suit particular applications. Further, references herein to "top," "upward," "upper," "higher," "lower," "bottom," "downward," "descending," "ascending," "side," "first," and "second" structures, elements, designations, geometries and the like are intended solely for purposes of providing an enabling disclosure and in no way suggest limitations regarding the operative orientation or order of the exemplary embodiments or any components thereof.

That which is claimed:

1. An environmentally sealed closure through which one or more input members are passed, the closure comprising:

a housing having a opening therethrough defining an edge and a longitudinal axis, the housing further including a wall defining an interior therein, the wall including an internal shoulder portion and an external shoulder portion, the internal shoulder portion delimiting an interior area within the interior;

a first plate disposed within the interior proximate the interior area in floating contact with the internal shoulder portion, the first plate being urged against the internal shoulder portion in a first pressure state and being urged in a direction of the opening in a second pressure state;

a seal disposed within the interior, the seal having a first side, a second side opposite the first side, and a peripheral area, the second side in contact with the first plate, the peripheral area in contact with an interior portion of the housing;

a second plate disposed at least partially within the interior ad in contact with the first side of the seal, the second plate having a flange portion in floating contact with the edge of the housing, the flange portion being urged against the edge in the first pressure state;

a plurality of respective openings defined in the first plate, the second plate and the seal member, wherein the respective openings are generally axially aligned and sized to selectively sealingly receive the input member therethrough; and a compression member disposed about the housing and connected to the second plate to compress the seal with a preloaded pressure between the first plate and the second plate and to urge the peripheral area in a direction of the interior portion of the housing to seal the closure, the compression member further including a lip in floating contact with the external shoulder portion, the lip being urged away from the external shoulder portion in the first pressure state and being urged against the external shoulder portion in the second pressure state, the first pressure state and the second pressure state creating a pressure differential between the interior area and an ambient pressure level to cause independent movement of the first and second plates to further compress the seal and increase the preloaded pressure of the seal.

2. An environmentally sealed closure according to claim 1, wherein the seal is made of an elastomeric material.

3. An environmentally sealed closure according to claim 1, wherein the compression member and the second plate are attached together by mating threads.

4. An environmentally sealed closure according to claim 1, further including a valve extending through the housing for altering the pressure within the interior area.

5. An environmentally sealed closure according to claim 1, wherein the wall of the housing includes a chamfered portion disposed adjacent the seal. The seal being urged against the chamfered portion when the compression member is attached to the second plate.

6. An environmentally sealed closure through which one or more input members are passed, the closure comprising:
    a housing having a wall defining an interior and a longitudinal axis, a portion of the interior comprising an interior area;
    a sealing assembly including a first plate, a seal and a second plate arranged in a stack along the longitudinal axis, the scaling assembly disposed within the interior proximate The interior area, the seal having an outer sealing edge for contacting the wall of the housing; and
    a compression member disposed about the housing and connected to the second plate for applying an initial compression to the sealing assembly along the longitudinal axis to generate an initial seal between the outer edge of the seal and the wall of the housing, whereby when a pressure level within the interior area differs from a pressure level outside the housing, the seal is further compressed by independent movements of the first and second plates.

7. An environmentally sealed closure according to claim 6, wherein the compression member and the second plate are configured to slide in an axial direction parallel to the longitudinal axis in a direction of the interior area when the pressure level outside the housing is greater than a pressure level within the interior area.

8. An environmentally scaled closure according to claim 7, wherein a stop is included on one of the second plate or the compression member to limit sliding along the axial direction toward the interior area.

9. An environmentally sealed closure according to claim 7, wherein a shoulder is included on the housing to limit the compression member from sliding along the axial direction in a direction away from the interior area.

10. An environmentally sealed closure according to claim 9, wherein the first plate is configured to slide along the axial direction away from the interior area when the pressure level inside the interior area is greater than the pressure level outside the housing.

11. An environmentally sealed closure according to claim 6, further including a valve extending through the housing for altering the pressure within the interior area.

12. An environmentally sealed closure according to claim 6, wherein the wall of the housing includes a chamfered portion adjacent the seal, the seal being urged against the chamfered portion when the compression member is connected to the second plate.

13. An environmentally sealed closure through which one or more input members are passed, the closure comprising:
    a housing defining a longitudinal axis and having a wall defining an interior, a portion of the interior comprising an interior area; and
    a floating sealing assembly including a first plate, a seal member and a second plate arranged in a stack along the longitudinal axis, the sealing assembly disposed within the interior adjacent the interior area, the seal member having an outer sealing edge for contacting the wall of the housing, the input member extending through the sealing assembly so that the terminated ends are within the interior area;
    wherein at least one of the first plate and second plate moves along the longitudinal axis to further compress the seal member and increase sealing between the outer sealing edge and the housing wall when a pressure differential exists between the interior area and the outside of the housing, and wherein the first plate and second plate move independently.

14. An environmentally sealed closure according to claim 13, wherein the housing wall includes at least one chamfered portion.

15. An environmentally sealed closure according to claim 13, wherein the seal member is made of an elastomeric material and is under a predetermined preloaded pressure when the sealing edge of the seal member is in sealing contact with the wall of the housing.

16. An environmentally sealed closure according to claim 13 further comprising a compression member disposed about the housing and attached to the second plate.

17. An environmentally sealed closure according to claim 16, wherein the compression member includes threads that mate with corresponding threads on the second plate.

18. An environmentally sealed closure according to claim 16, wherein the housing defines an external shoulder on the housing wall adapted to floatingly engage a portion of the compression member.

19. An environmentally sealed closure according to claim 16, wherein the housing defines an internal shoulder on the housing wall to floatingly engage the first plate.

* * * * *

UNITED STATES PATENT AND TRADEMARK OFFICE
CERTIFICATE OF CORRECTION

PATENT NO. : 7,650,055 B2  Page 1 of 1
APPLICATION NO. : 11/881518
DATED : January 19, 2010
INVENTOR(S) : Terry Dean Cox et al.

It is certified that error appears in the above-identified patent and that said Letters Patent is hereby corrected as shown below:

| Col. | Line | *Description* should read: |
|------|------|-----------------------------|
| 8 | 33 | a housing having an opening therethrough defining an edge |
| 8 | 51 | and in contact with the first side of the seal, the second |
| 9 | 18 | disposed adjacent the seal**,** the seal being urged against the |
| 9 | 28 | axis, the sealing assembly disposed within the interior |
| 9 | 29 | proximate the interior area, the seal having an outer |
| 9 | 46 | An environmentally sealed closure according to claim 7 |

Signed and Sealed this
Sixth Day of December, 2011

David J. Kappos
*Director of the United States Patent and Trademark Office*